(12) United States Patent
Komatsu et al.

(10) Patent No.: US 7,948,193 B2
(45) Date of Patent: May 24, 2011

(54) SINGLE PHASE AC SYNCHRONOUS MOTOR

(75) Inventors: Fumito Komatsu, Shiojiri (JP); Hideaki Osada, Shiojiri (JP); Akira Tooyama, Shiojiri (JP); Makoto Murakami, Shiojiri (JP)

(73) Assignees: Yugen Kaisha K. R & D, Shiojiri (JP); Yugen Kaisha Dijianet, Shiojiri (JP)

( * ) Notice: Subject to any disclaimer, the term of this patent is extended or adjusted under 35 U.S.C. 154(b) by 259 days.

(21) Appl. No.: 12/444,028

(22) PCT Filed: Sep. 27, 2007

(86) PCT No.: PCT/JP2007/068786
§ 371 (c)(1),
(2), (4) Date: Apr. 2, 2009

(87) PCT Pub. No.: WO2008/050575
PCT Pub. Date: May 2, 2008

(65) Prior Publication Data
US 2010/0026231 A1 Feb. 4, 2010

(30) Foreign Application Priority Data
Oct. 26, 2006 (JP) ................. 2006-291580

(51) Int. Cl.
*H02K 21/00* (2006.01)
*H02P 6/00* (2006.01)

(52) U.S. Cl. ......... 318/400.01; 318/400.11; 318/400.29; 318/778; 318/816

(58) Field of Classification Search .......... 318/101–103, 318/700, 400.01, 400.03, 400.11, 400.26, 318/400.29, 400.35, 400.38, 778, 816, 294, 318/293; 310/68 B, 68 R
See application file for complete search history.

(56) References Cited

U.S. PATENT DOCUMENTS

| | | | | |
|---|---|---|---|---|
| 4,678,972 A * | 7/1987 | Lehnhoff et al. | ........ | 318/400.11 |
| 4,737,674 A * | 4/1988 | Miyao | ........... | 310/268 |
| 4,912,379 A * | 3/1990 | Matsuda et al. | ........ | 318/400.23 |
| 6,362,581 B1* | 3/2002 | Matsushiro et al. | ..... | 318/400.11 |
| 6,400,109 B1* | 6/2002 | Helmut | ............ | 318/400.11 |
| 6,424,114 B1* | 7/2002 | Komatsu | ........... | 318/721 |
| 6,806,666 B2* | 10/2004 | Kim et al. | ............ | 318/362 |
| 7,242,160 B2* | 7/2007 | Wang et al. | ........... | 318/400.11 |
| 2002/0171381 A1* | 11/2002 | Miyazaki et al. | ........ | 318/254 |
| 2006/0145638 A1* | 7/2006 | Gerfast | ............ | 318/254 |
| 2010/0207557 A1* | 8/2010 | Wilkinson | ............ | 318/400.15 |

FOREIGN PATENT DOCUMENTS

| | | |
|---|---|---|
| JP | 52-153018 U | 12/1977 |
| JP | 57-162971 A | 10/1982 |
| JP | 62-77885 A | 4/1987 |

(Continued)

*Primary Examiner* — Eduardo Colon Santana
(74) *Attorney, Agent, or Firm* — Birch, Stewart, Kolasch & Birch, LLP

(57) ABSTRACT

An inexpensive, productivity-enhanced single-phase AC synchronous motor in which stabilized synchronous pull-in can be carried out by suppressing generation of counter torque during a starting operation. Starting operation is performed while the energizing range of motor current is suppressed such that the energizing direction of motor current waveform lagging in a phase behind the output waveform from a detection sensor (17) is switched at at least the zero cross point of the output waveform from the sensor when the number of revolutions of a permanent magnet rotor (1) reaches a predetermined number of revolutions in the vicinity of the synchronous number of revolutions.

3 Claims, 8 Drawing Sheets

FOREIGN PATENT DOCUMENTS

| | | |
|---|---|---|
| JP | 2000-83390 A | 3/2000 |
| JP | 3050851 B2 | 6/2000 |
| JP | 2001-169576 A | 6/2001 |
| JP | 2002-233184 A | 8/2002 |

\* cited by examiner

SINGLE-PHASE AC WAVEFORM

FULL-WAVE RECTIFIED WAVEFORM

WAVEFORM CORRESPONDING TO THAT OF POWER SOURCE
INVERTED WAVEFORM

IN CASE OF TWO-POLE MOTOR WAVEFORM CORRESPONDING TO THAT OF POWER SOURCE AND INVERTED WAVEFORM ARE INVERTED EVERY 180 DEGREES.

WAVEFORM OF STARTING REVOLUTIONS

FIRST REVOLUTION
SECOND REVOLUTION
THIRD REVOLUTION
FOURTH REVOLUTION

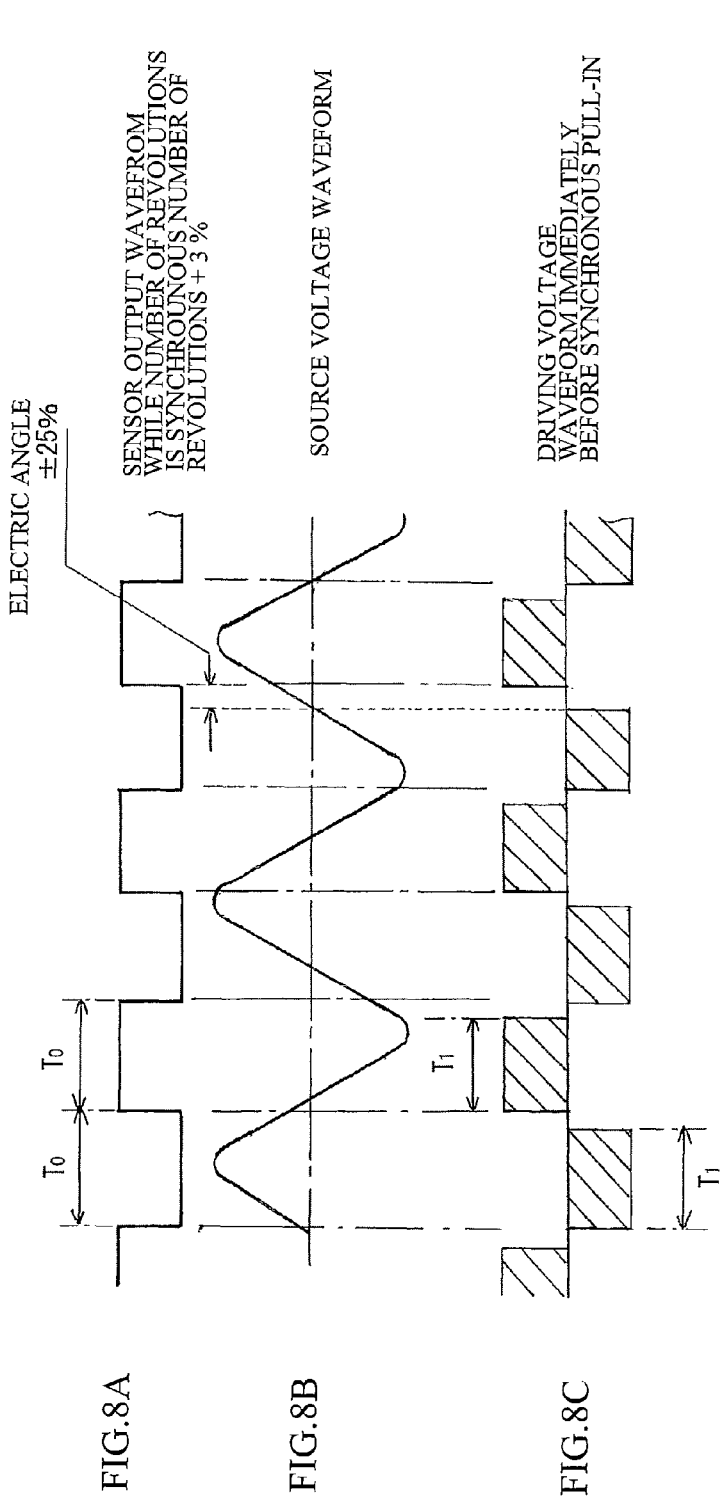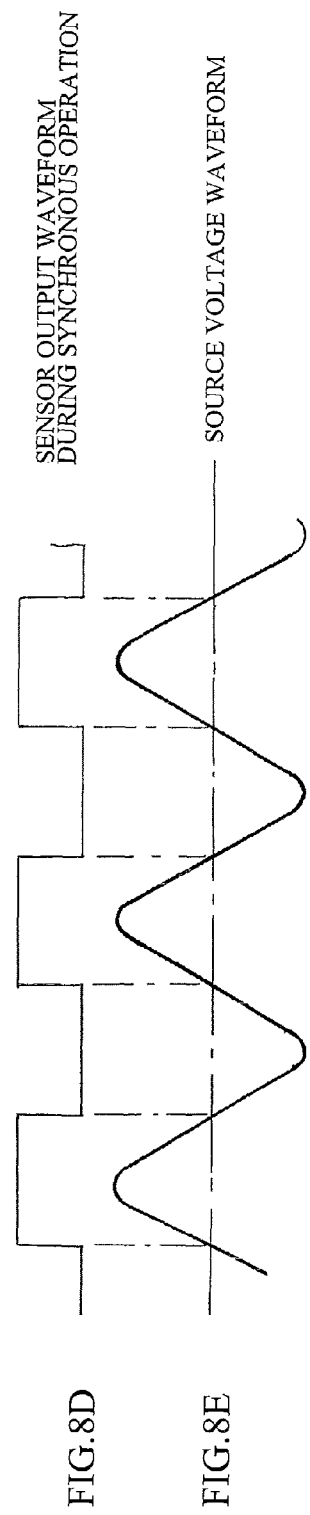

SINGLE PHASE AC SYNCHRONOUS MOTOR

FIELD OF TECHNOLOGY

The present invention relates to a single-phase AC synchronous motor.

BACKGROUND TECHNOLOGY

A high-efficiency, reliable compact synchronous motor, which is capable of securely changing from starting operation to synchronous operation, has been developed. In the synchronous motor, alternate current supplied from an AC power source is switching-controlled and full-wave rectified, by a bridge rectifier circuit, for the starting operation. At that time, for example, only an A coil of a motor coil, which is divided into the A coil and a B coil by an intermediate tap, is energized to pass relatively high current for the starting operation, and positive or negative energizing range of the rectified current is switching-controlled so as to converge the current waveform to one side. When number of revolutions of a magnet rotor is in the vicinity of a synchronous number of revolutions with respect to a power source frequency, an operation changing switch is actuated to transfer the operation to synchronous operation (see Patent Document 1).

Patent Document 1: Japanese Patent No. 3050851

DISCLOSURE OF THE INVENTION

However, in a starting operation circuit of the above described synchronous motor, DC resistance of a motor coil is low and high current passes the motor coil while the starting operation, so expensive electronic parts, whose rated capacitance are high, must be used. High surge voltage is generated when the energizing direction of the motor coil is changed by the revolution of the rotor, and electronic parts will be damaged by the surge voltage. In the starting operation circuit, even if a surge absorbing element, e.g., varistor, is provided between the bridge rectifier circuit and the switching circuit, the surge voltage cannot be perfectly absorbed.

In the starting operation, alternate current supplied from a single-phase AC power source shown in FIG. 6A is full-wave rectified as shown in FIG. 6B, and the positive side or the negative side of the rectified sinusoidal current is chopper-controlled so as to converge rotational phase of the magnetic poles of the rotor with that of a source voltage waveform. On the other hand, by smoothing the motor current passing through the motor coil, electronic parts having low rated capacitance may be used. For example, a waveform of starting the revolution, which has been full-wave rectified by a filter circuit, is shown in FIG. 6C. In the waveform shown in FIG. 6C, data of source frequency are removed by the smoothing, so timing of the synchronous pull-in cannot be detected.

FIG. 7A shows detection signals (rectangular waveform) of a hall element and the source voltage waveform (sinusoidal waveform), and their phases are nearly corresponded during the synchronous operation with rated load.

However, in the starting operation, the phase of the motor current lags behind the rotational phase of the motor current. The reason is that the current direction of the motor current passing through the motor coil is not simultaneously changed with the source current waveform due to inductance of the motor coil even if the positions of the magnetic poles are changed as shown in FIG. 7B. Therefore, counter torque works to the rotor in the starting operation. The counter torque does not influence while the number of revolutions of the rotor is low, but it cannot be ignored with increasing the number of revolutions and shortening switching intervals, and the number of revolutions cannot be increased to the synchronous number of revolutions.

In the starting operation, if a part of the motor coil is energized, the motor current is made high and the surge voltage generated by switching the energization is also increased, so expensive electronic parts having high capacitance must be used and production cost must be increased.

Further, the intermediate tap is required so as to partially energize the motor coil, so production steps of the motor coil must be increased, wiring length must be longer and productivity must be lowered.

An object of the present invention is to solve the above described problems and provide an inexpensive, productivity-enhanced single-phase AC synchronous motor, in which stabilized synchronous pull-in can be carried out by suppressing generation of counter torque during a starting operation.

To achieve the object, the present invention has following structures.

The single-phase AC synchronous motor comprises: a starting operation circuit for starting the motor as a DC brushless motor, the starting operation circuit rectifying alternate current supplied from a single-phase AC source by a bridge rectifier circuit, generating direct current smoothed by a filter circuit, and switching start-switching means on the basis of detection signals sent from a detection sensor, which detects positions of magnetic poles of a permanent magnet rotor, so as to switch the direction of motor current and supply the motor current to a motor coil connected to the single-phase AC source; a synchronous operation circuit supplying the alternate current to the motor coil so as to perform synchronous operation as an AC synchronous motor; an operation changing switch being provided between the single-phase AC source and the motor coil, the operation changing switch selectively energizing the starting operation circuit and the synchronous operation circuit; and control means for controlling the operation changing switch to change the energization from the starting operation circuit to the synchronous operation circuit so as to perform the synchronous operation, and the motor is characterized in that the control means controls the operation changing switch, on the basis of the detection signals of the detection sensor, so as to perform the starting operation in a state where the operation changing switch connects the single-phase AC source to the starting operation circuit, and starting operation is performed while the energizing range of the motor current is suppressed such that the energizing direction of a motor current waveform lagging in a phase behind an output waveform from the detection sensor is switched at at least the zero cross point of the output waveform from the sensor when number of revolutions of the permanent magnet rotor reaches a predetermined number of revolutions in the vicinity of synchronous number of revolutions.

Preferably, the single-phase AC synchronous motor is characterized in that the control means continues the starting operation with suppressing an energizing range of the motor current when the number of revolutions of the permanent magnet rotor is increased to 70-80% of the synchronous number of revolutions, and the control means changes the operation to the synchronous operation when an electric angle of phase difference between revolution phase of the magnetic poles and a source voltage waveform reaches a predetermined angle range while controlling the start-switching means to maintain the predetermined number of revolutions of the permanent magnet rotor in the vicinity of the synchronous number of revolutions.

Preferably, the single-phase AC synchronous motor is characterized in that the control means controls the operation changing switch so as to change the operation to the synchronous operation when an electric angle of phase difference between revolution phase of the magnetic poles and a source voltage waveform reaches a predetermined angle range with the start-switching means maintaining the number of revolutions of the permanent magnet rotor higher than the synchronous number of revolutions, while performing synchronous pull-in.

Effects of the Invention

In the single-phase AC synchronous motor of the present invention, the control means performs the starting operation while the energizing range of the motor current is suppressed such that the energizing direction of the motor current waveform lagging in a phase behind the output waveform from the detection sensor is switched at at least the zero cross point (switching point) of the output waveform from the sensor when the number of revolutions of the permanent magnet rotor reaches the predetermined number of revolutions in the vicinity of the synchronous number of revolutions.

With this action, the stabilized synchronous pull-in can be carried out by suppressing generation of counter torque and the number of revolutions of the permanent magnet rotor can be increased to the synchronous number of revolutions during the starting operation.

The entire motor coil is energized during the starting operation, so that resistance can be increased, the motor current can be lower, surge voltage generated by switching actions can be absorbed by a filter circuit and inexpensive electronic parts, whose rated capacitance are low, can be used.

Further, no intermediate tap is required, so that the motor coil can be easily produced, number of wires can be reduced and a drive circuit can be simplified.

BRIEF DESCRIPTION OF THE DRAWINGS

FIGS. 8A-8E are waveform charts of the sensor output waveform during starting operation and synchronous operation, the source voltage waveform and the driving voltage waveform.

OPTIMUM EMBODIMENTS OF THE INVENTION

The optimum embodiments of the present invention will now be described in detail with reference to the accompanying drawings.

Figure 4A:
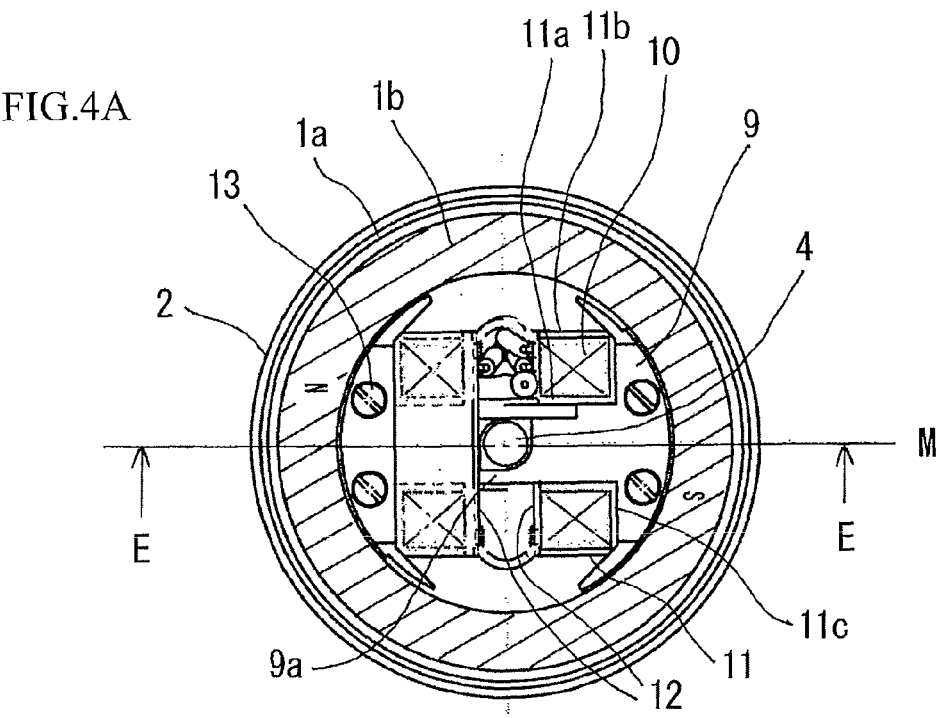
FIG. 4A is a horizontal sectional view of a two-pole synchronous motor.
Figure 4B:
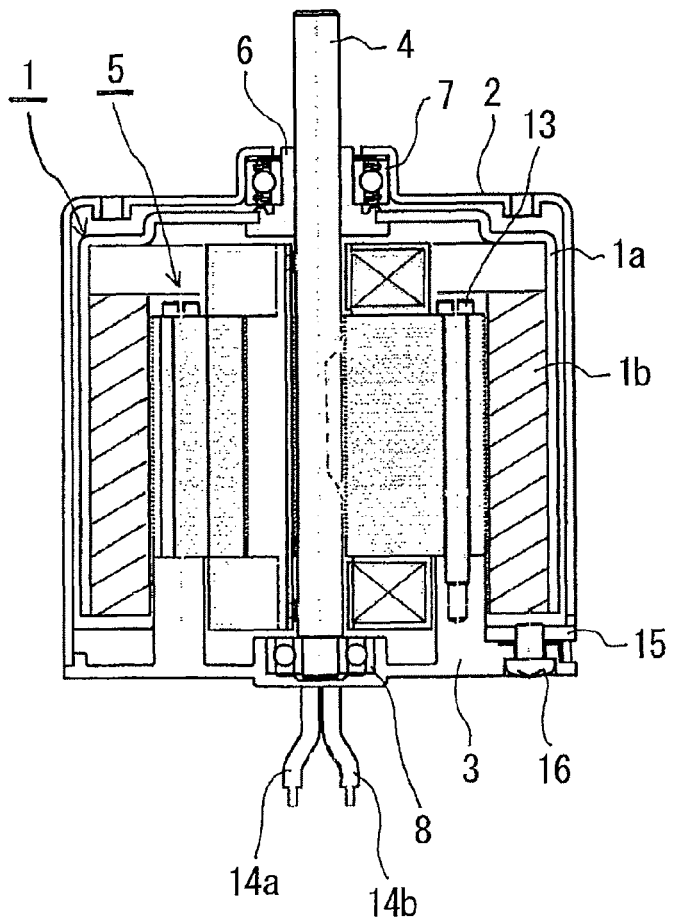
FIG. 4B is a front sectional view thereof.

Firstly, a two-pole AC synchronous motor, whose output power is about 10 W or less, will be explained as an embodiment. In FIG. 4B, an output shaft 4 of a rotor 1 is rotatably supported by an upper housing 2 and a lower housing 3. The output shaft 4 is pierced through a stator 5, a boss section 6, which is fitted to one end of the output shaft 4, is rotatably supported by a bearing 7, and the other end thereof is rotatably supported by a bearing 8. The one end of the output shaft 4 is upwardly projected from the upper housing 2, the other end thereof may be downwardly projected from the lower housing 3, or the both ends may be projected from the housings. In the rotor 1, a ring magnet 1*b*, in which a N-pole and a S-pole respectively formed at angular of 180 degrees, is attached on an inner face of a cylindrical rotor yoke 1*a*. The upper housing 2 and the lower housing 3 are connected by screws 16.

A stator 2 will be explained. In FIG. 4A, a splittable stator core 9 is attached to axial ends of bobbins 11, on which motor coil 10 are wounded, and can be detached from the bobbins 11. Wire connection boards 12, which are used for mutually connecting the separated motor coil 10, are respectively provided on facing surfaces of the bobbins 11. The stator core 9 is fixed to a stator mounting section of the lower housing 3 by bolts 13.

The output shaft 4 is pierced through a space enclosed by contact sections 9*a* of the stator core 9, which contact each other. A configuration of the stator core 9 on one side of a center line M is different from that on the other side thereof so as to make the stator core magnetically asymmetry with respect to the center line M.

In each of the bobbins 11, the motor coil 10, which has been previously wound, is fitted in a groove section, which has a U-shaped cross section and constituted by a tubular core section 11*a*, a wall section 11*b* enclosing the core section and a bridge section 11*c* integrating the both. The wire connection board 12 is fixed to the end face of the wall section 11*b* of each of the bobbins 11 by, for example, welding.

Figure 5:
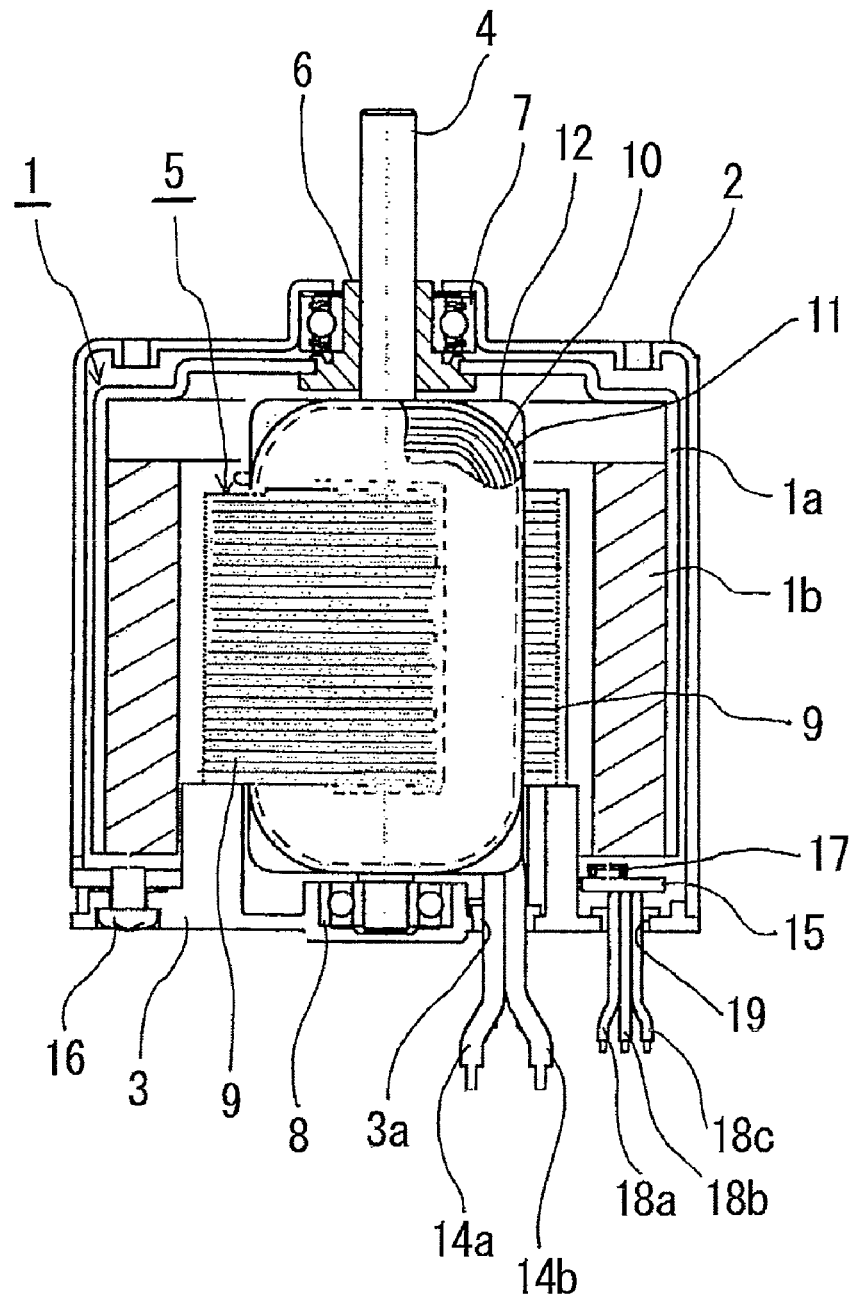
FIG. 5 is a sectional view taken along a line E-E shown in FIG. 4A.
Figure 6A:
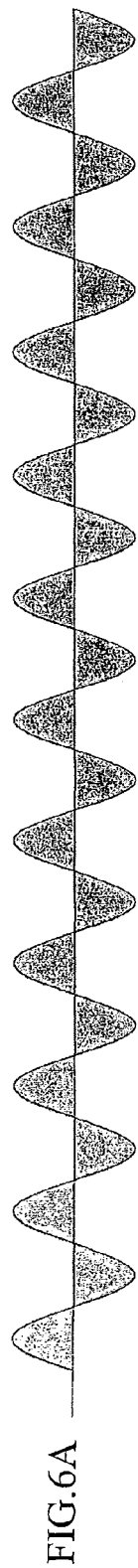
FIGS. 6A-6C are waveform charts of a motor coil of the two-pole synchronous motor.
Figure 6B:
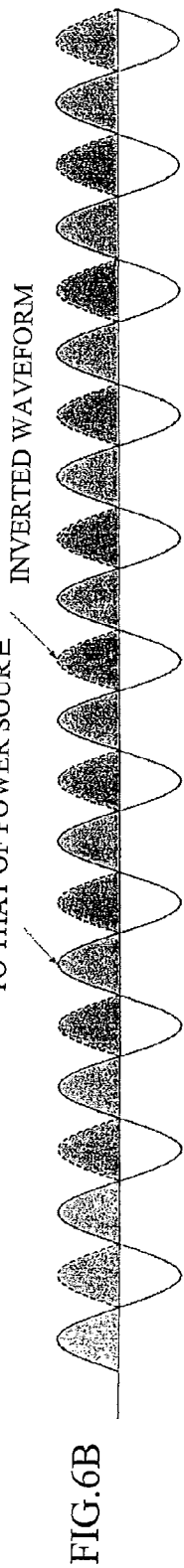
Figure 6C:
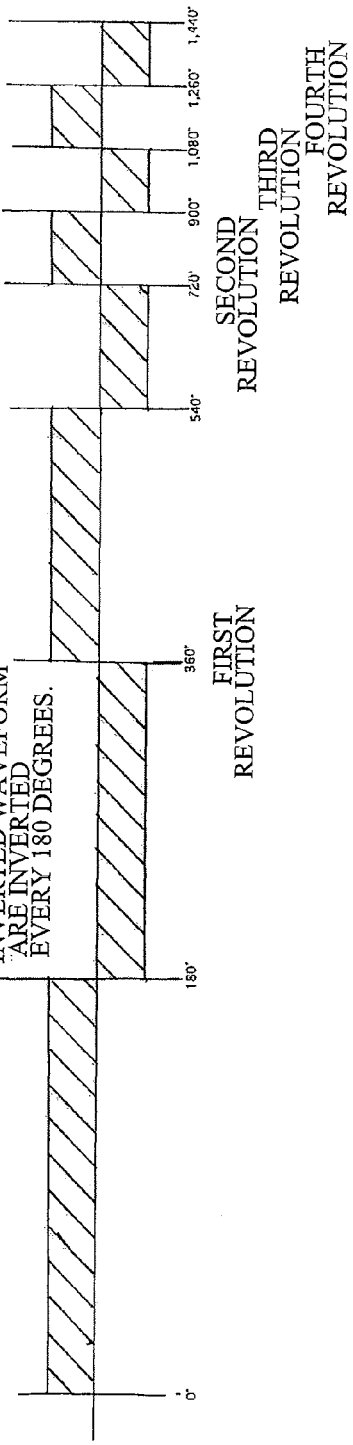
Figure 7A:
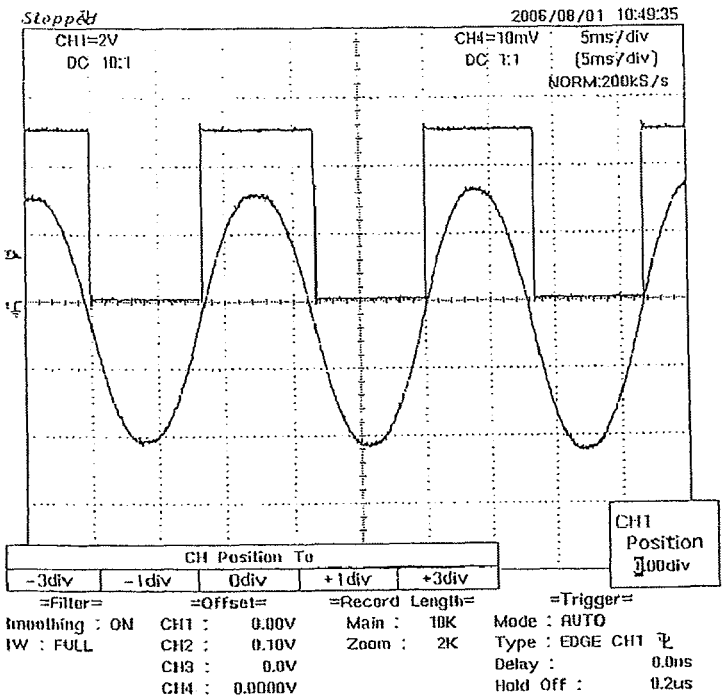
FIGS. 7A and 7B are waveform charts, in each of which a sensor output waveform and a source voltage waveform are shown.
Figure 7B:
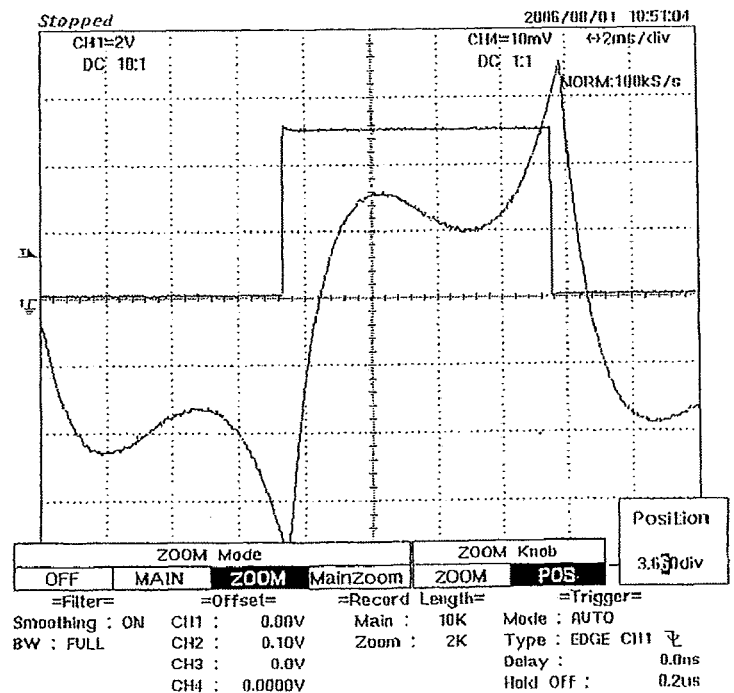

In FIG. 5, connection wires 14*a* and 14*b*, which are connected to the wire connection boards 12, are downwardly extended from the lower housing via a wire hole 3*a* of the lower housing 3. A sensor board 15 is fixed to the lower housing 3 by screws (not shown). A hall element 17 is mounted on the sensor board 15, and connection wires 18*a*, 18*b* and 18*c*, which are connected to the sensor board 15, are extended from the lower housing via a wire hole 19 formed immediately under the sensor board.

Figure 1:
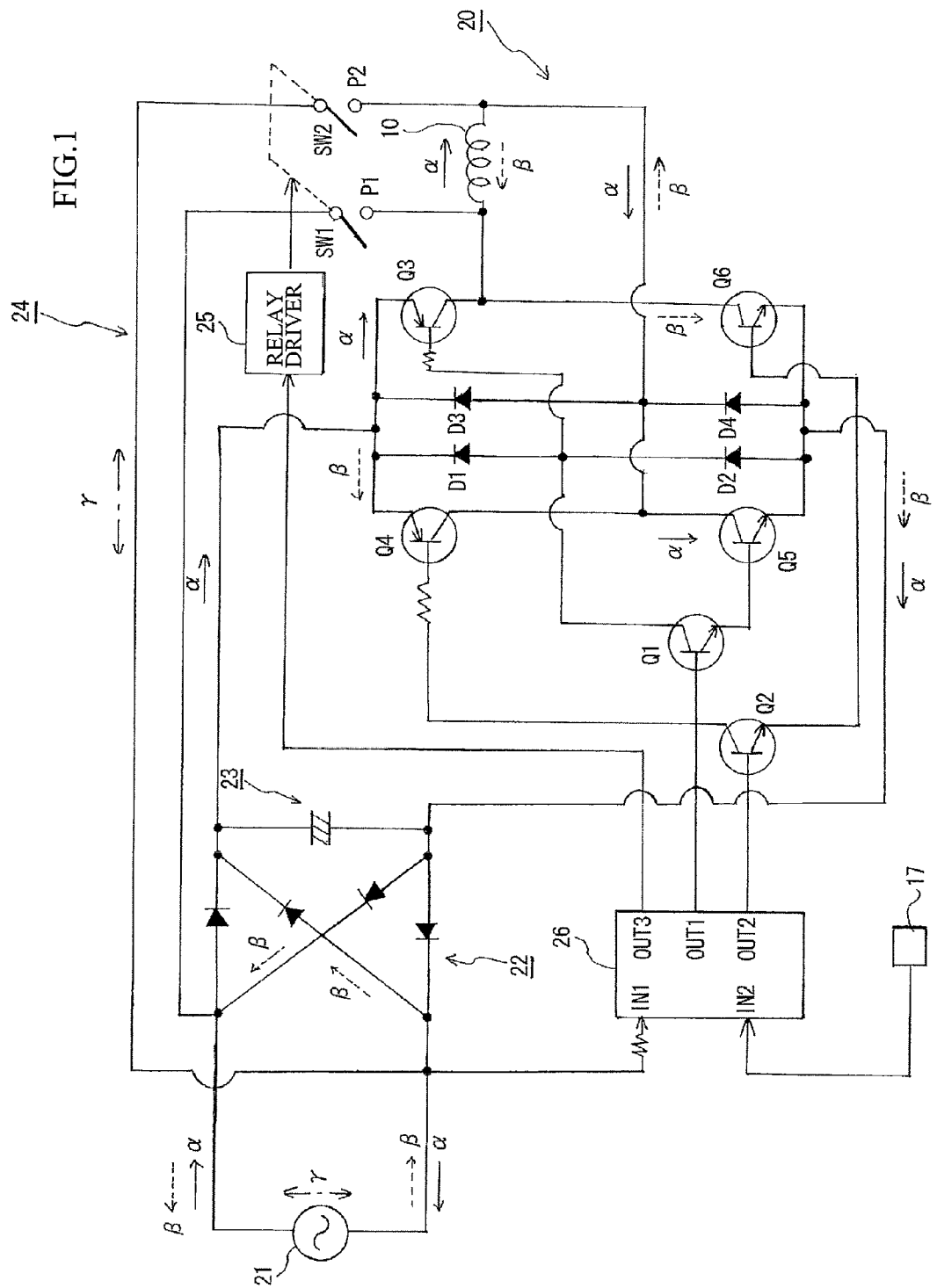
FIG. 1 is an explanation view of a starting operation circuit and a synchronous operation circuit of a single-phase AC synchronous motor.

Next, an example of a drive circuit of the above described two-pole synchronous motor will be explained with reference to FIG. 1.

A starting operation circuit 20 starts the two-pole synchronous motor as a DC brushless motor. Namely, AC current supplied from an AC power source 21 is rectified by a bridge rectifier circuit (diode bridge circuit) 22, and a filter circuit 23 (a capacitor C in the present example) smoothes the rectified current so as to generate DC current. Starting transistors Q1-Q6, which act as start-switching means, change the direction of the motor current on the basis of the rotational angle of the rotor magnet so as to energize the motor coil 10 for the starting operation. The filter circuit 23 may be constituted by serially connecting the capacitor C to a choke coil instead of only the capacitor C.

On the other hand, a synchronous operation circuit 24 energizes the motor coil 10, which is connected to the AC power source 21, so as to synchronously operate the two-pole synchronous motor as an AC synchronous motor. Operation changing switches SW1 and SW2, which are provided between the AC power source 22 and the motor coil 10, selectively energize the starting operation circuit 20 and the synchronous operation circuit 24. The operation changing switches SW1 and SW2 are actuated by a relay driver 25, which is an example of operation switching means and which electromagnetically switches contact points P1 and P2. In the starting operation, the operation changing switches SW1 and SW2 are separated from the contact points P1 and P2; in the synchronous operation, the operation changing switches SW1 and SW2 are connected to the contact points P1 and P2. At that time, output signals of a drive control section 26 sent to the starting transistors Q1-Q6 are turned off, so that the starting operation circuit 20 is disconnected from the motor coil 10.

The drive control section 26 (micro computer) is an example of control means for controlling the starting operation circuit 20, the synchronous operation circuit 24 and the relay driver 25, and frequency data of the AC power source 21 are inputted to an input terminal IN1 of the drive control section 26. Date including positions of the rotor magnetic poles and revolution number of the rotor, which are detected by the hall element 17, are inputted to an input terminal IN2. Signals for turning on/off the transistor Q1 are outputted from an output terminal OUT1, signals for turning on/off the transistor Q2 are outputted from an output terminal OUT2, and switching signals are sent to the relay drive 25 from an output terminal OUT3.

The drive control section 26 turns off the operation changing switches SW1 and SW2 and switching-controls the transistors Q1-Q6, on the basis of detection signals of the hall element 17, in the state where the starting operation circuit 20 is connected to the AC power source 21, so as to perform the starting operation. When number of revolutions of the rotor reaches a predetermined number of revolutions in the vicinity of synchronous number of revolutions, the drive control section 26 performs the starting operation while the energizing range of the motor current is suppressed such that the energizing direction of a motor current waveform lagging in a phase behind an output waveform of the hall element 17 is switched at at least the zero cross point (switching point) of the output waveform thereof. The drive control section switching-controls the transistors Q1-Q6 so as to maintain the predetermined number of revolutions of the rotor, which is in the vicinity of the synchronous number of revolutions, and actuates the relay driver 25 so as to turn on the operation changing switches SW1 and SW2 and connect the switches to the motor coil 10 when an electric angle of phase difference between revolution phase of the magnetic poles and a source voltage waveform reaches a predetermined angle range, so that the operation of the motor is transferred to the synchronous operation.

Next, an example of the starting operation will be explained. In FIG. 1, when the rotational angle of the rotor 1 is within 0-180 degrees, an output signal is outputted from the output terminal OUT1, the transistor Q1 is turned on, and the transistors Q3 and Q5, which are serially connected to the transistor Q1, are also turned on. At that time, DC current (current having a rectangular waveform), whose direction is indicated by an arrow α, passes through the motor coil 10.

Next, when the rotational angle of the rotor 1 is within 180-360 degrees, an output signal is outputted from the output terminal OUT2, the transistor Q2 is turned on, and the transistors Q4 and Q6, which are serially connected to the transistor Q2, are also turned on. At that time, DC current (current having a rectangular waveform), whose direction is indicated by an arrow β, passes through the motor coil 10. Note that, the output signals are alternately outputted from the output terminals OUT1 and OUT2, but the output signals are not simultaneously outputted from the both output terminals.

Figure 2:
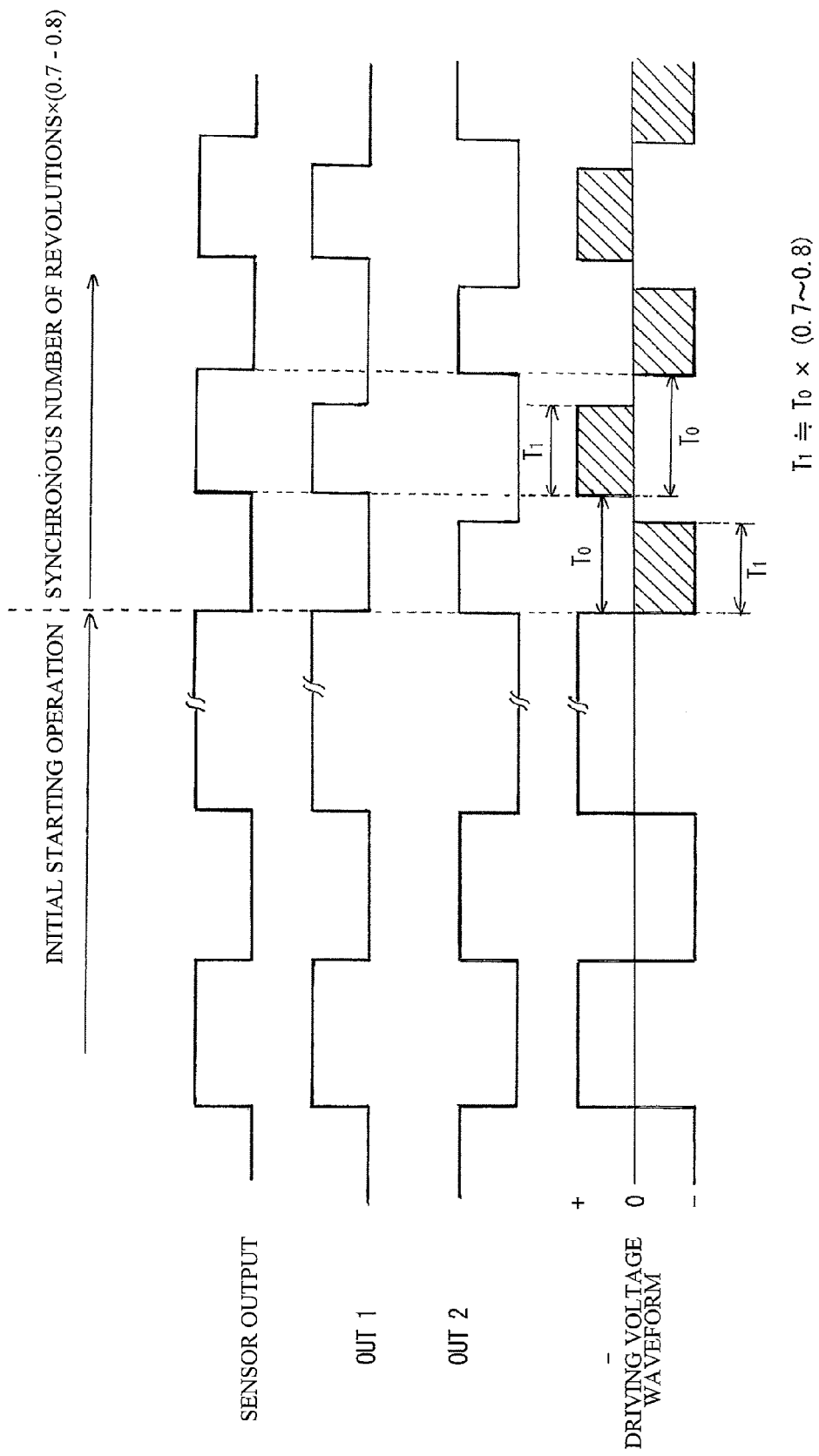
FIG. 2 includes a sensor output waveform chart, an output signal waveform chart of an output terminal and a driving voltage waveform chart of the motor.

An output waveform (sensor output waveform) of the hall element 17, output waveforms from the output terminals OUT1 and OUT2 of the drive control section 26 (micro computer) and a driving voltage waveform are shown in FIG. 2.

Figure 3:
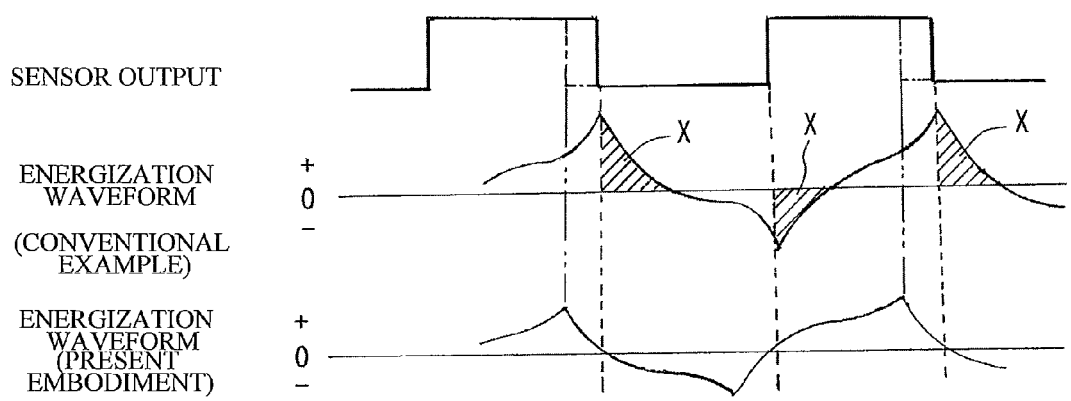
FIG. 3 is an explanation view indicating a relationship between the sensor output waveform during synchronous pull-in and a motor current waveform.

In FIG. 2, first half of each of the waveform charts is initial starting operation; latter half thereof is the starting operation, in which number of revolutions is the synchronous number of revolutions×(0.7 to 0.8). While the rotor 1 rotates 360 degrees, the sensor outputs signals (rectangular wave) corresponding to the N-pole and the S-pole respectively having the angular range of 180 degrees and energizing signals are alternately outputted from the output terminal OUT1 and OUT2 on the basis of the detection signals. The motor current is synchronously supplied with the sensor output. When the number of revolutions of the rotor 1 reaches the predetermined number of revolutions in the vicinity of the synchronous number of revolutions, the motor current is influenced by brake current, which is applied by inductance of the motor coil 10, etc. and the motor current waveform, which is shown as a middle waveform chart of FIG. 3, lags in a phase behind the output waveform of the sensor (the hall element 17), which is in the upper waveform chart thereof. The middle waveform chart of FIG. 3 shows the waveform of the motor current of the conventional motor; the lower waveform chart thereof shows that of the present embodiment. Hatched parts X of the conventional waveform are energizing ranges causing counter torque. By the energizing ranges X, number of revolutions of the rotor 1 will not reach the synchronous number of revolutions. Thus, as shown by the lower waveform chart of FIG. 3, the starting operation is performed while the energizing range of the motor current is suppressed such that the energizing direction of the motor current waveform is switched at at least the zero cross point (switching point) of the output waveform of the sensor.

Concretely, when the number of revolutions of the rotor 1 is increased to 70-80% of the synchronous number of revolutions, the drive control section 26 continues the starting operation with suppressing the energizing range which is controlled on the basis of the output signals from the output terminals OUT1 and OUT2 shown in FIG. 2. In FIG. 2, the energizing range T1 of the motor current is suppressed within a range indicated by the formula of $T1 \approx T0 \times (0.7 \text{ to } 0.8)$, wherein T0 is an ordinary energizing range of the motor current controlled on the basis of the output of the sensor.

While the drive control section 26 switching-controls the transistors Q1-Q6 so as to maintain the predetermined number of revolutions of the rotor in the vicinity of the synchronous number of revolutions, the drive control section sends the output signal from the output terminal OUT3 to the relay driver 25 so as to actuate the operation changing switches SW1 and SW2 to contact the contact points P1 and P2 for the synchronous operation when the electric angle of the phase difference between the revolution phase of the rotor magnetic poles and the source voltage waveform reaches the predetermined angle range. At that time, in FIG. 1, the AC current, which is indicated by an arrow γ and which is supplied from the AC power source 21, passes through the circuit in which the motor coil 10 is serially connected to the AC power source.

When synchronous pull-in is performed, the drive control section 26 turns on the operation changing switches SW1 and SW2 so as to drive the synchronous operation circuit 24 while the number of revolutions of the rotor is maintained at the predetermined number of revolutions in the vicinity of synchronous number of revolutions (e.g., the synchronous number ±3%), so that the operation can be smoothly transferred to the synchronous operation.

FIGS. 8A-8C are waveform charts of the sensor output waveform, the source voltage waveform and the driving voltage waveform during the starting operation, and FIGS. 8D and 8E are waveform charts of the sensor output waveform and the source voltage waveform during the synchronous operation. When the number of revolutions of the rotor reaches the predetermined number of revolutions, which is the synchronous number ±3%, and the phase difference between the revolution phase of the magnetic poles (see FIG. 8A) and the source voltage waveform (see FIG. 8B) is within ±25% of one cycle, the operation changing switches SW1 and SW2 are switched to perform the synchronous operation as shown in FIGS. 8D and 8E. In case that the motor is continuously revolved at the predetermined number of revolutions, e.g., the synchronous number+3%, the phase difference between the revolution phase of the magnetic poles and the source voltage waveform are often corresponded within a predetermined range as shown in FIGS. 8A and 8B. Note that, the sensor output waveform and the driving voltage waveform during the synchronous operation are similar to those shown in FIGS. 8D and 8E.

Therefore, even if the phase of the motor current lags behind the revolution phase of the magnetic poles of the rotor, the number of revolutions of the rotor can be increased to the synchronous number with restraining generation of counter torque and stabilized synchronous pull-in can be performed.

The entire motor coil can be energized during the starting operation, so that the resistance can be increased, starting current can be reduced, surge voltage generated by switching action can be absorbed by the filter circuit and inexpensive electronic parts, whose rated capacitance is low, can be used.

Further, no intermediate taps are provided to the motor coil 10, so that the motor coil 10 can be easily produced, number of wires can be reduced and the drive circuit can be simplified.

The two-pole synchronous motor has been described in the above described embodiment, but the above described starting operation circuit 20, the drive control, etc. can be applied to, for example, four-, six- and eight-pole single-phase AC synchronous motors.

The invention claimed is:

1. A single-phase AC synchronous motor, comprising:
   a starting operation circuit for starting said motor as a DC brushless motor, said starting operation circuit rectifying alternate current supplied from a single-phase AC source by a bridge rectifier circuit, generating direct current smoothed by a filter circuit, and switching start-switching means on the basis of detection signals sent from a detection sensor, which detects positions of magnetic poles of a permanent magnet rotor, so as to switch the direction of motor current and supply the motor current to a motor coil connected to the single-phase AC source;
   a synchronous operation circuit supplying the alternate current to the motor coil so as to perform synchronous operation as an AC synchronous motor;
   an operation changing switch being provided between the single-phase AC source and the motor coil, said operation changing switch selectively energizing said starting operation circuit and said synchronous operation circuit; and
   control means for controlling said operation changing switch to change the energization from said starting operation circuit to said synchronous operation circuit so as to perform the synchronous operation,
   wherein said control means controls said operation changing switch, on the basis of the detection signals of the detection sensor, so as to perform the starting operation in a state where said operation changing switch connects the single-phase AC source to said starting operation circuit, and starting operation is performed while the energizing range of the motor current is suppressed such that the energizing direction of a motor current waveform lagging in a phase behind an output waveform from the detection sensor is switched at at least the zero cross point of the output waveform from the sensor when number of revolutions of the permanent magnet rotor reaches a predetermined number of revolutions in the vicinity of synchronous number of revolutions.

2. The single-phase AC synchronous motor according to claim 1, wherein said control means continues the starting operation with suppressing an energizing range of the motor current when the number of revolutions of the permanent magnet rotor is increased to 70-80% of the synchronous number of revolutions, and said control means changes the operation to the synchronous operation when an electric angle of phase difference between revolution phase of the magnetic poles and a source voltage waveform reaches a predetermined angle range while controlling the start-switching means to maintain the predetermined number of revolutions of the permanent magnet rotor in the vicinity of the synchronous number of revolutions.

3. The single-phase AC synchronous motor according to claim 1, wherein said control means controls said operation changing switch so as to change the operation to the synchronous operation when an electric angle of phase difference between revolution phase of the magnetic poles and a source voltage waveform reaches a predetermined angle range with the start-switching means maintaining the number of revolutions of the permanent magnet rotor higher than the synchronous number of revolutions, while performing synchronous pull-in.

* * * * *